United States Patent [19]

Bell

[11] 3,872,016

[45] Mar. 18, 1975

[54] FILTER AID MATERIALS DISPERSIBLE IN ORGANIC LIQUIDS

[75] Inventor: George Richard Bell, Larkspur, Colo.

[73] Assignee: Johns-Manville Corporation, Greenwood Village, Colo.

[22] Filed: Mar. 25, 1974

[21] Appl. No.: 454,532

[52] U.S. Cl. .................................................. 210/500
[51] Int. Cl. ............................................ B01d 39/00
[58] Field of Search ...................... 210/75, 193, 500

[56] References Cited
UNITED STATES PATENTS

| | | | |
|---|---|---|---|
| 3,282,435 | 11/1966 | Goldberg et al. | 210/500 |
| 3,335,869 | 8/1967 | Hedges | 210/500 |
| 3,360,474 | 12/1967 | Cooley et al. | 210/75 X |
| 3,368,678 | 2/1968 | Gilbert | 210/75 |
| 3,570,669 | 3/1971 | Davis | 210/75 |
| 3,648,847 | 3/1972 | Davis | 210/500 |

*Primary Examiner*—Samih N. Zaharna
*Assistant Examiner*—Richard W. Burks
*Attorney, Agent, or Firm*—Robert M. Krone; John H. Miller

[57] ABSTRACT

Filter aids such as diatomite and perlite tend to flocculate when added to relatively non-polar organic liquids such as certain solvents, oils, fats and other non-polar liquids. This flocculation frustrates the formation of a satisfactory filter cake or precoat of the filter aid for filtration purposes. Filter aid particles having a small amount of an aliphatic or aromatic hydroxypoly (oxyethylene) mixture of dihydrogen phosphate and monohydrogen phosphate esters absorbed on the surfaces thereof have been found to be highly dispersible in a wide range of different organic liquids.

10 Claims, No Drawings

FILTER AID MATERIALS DISPERSIBLE IN ORGANIC LIQUIDS

This invention relates to filter aid particles having a small amount of a complex organic phosphate ester of nonionic surfactant of the ethylene oxide-adduct type absorbed on the surface thereof, which filter aid particles are readily dispersible in relatively non-polar organic liquids.

BACKGROUND OF THE INVENTION

Filter aid materials are frequently added to liquid slurries to enhance filtration of the slurries by forming a permeable filter cake, with or without a precoat, on a more permeable septum. Filter aid materials enhance filtration because of their unique properties, usually attributed to the unusual shapes of the individual particles. When deposited as a filter cake from an aqueous slurry during the course of filtration, the filter aid particles form a stable, highly permeable, and very retentive layer of uniform thickness. Retention of a filter aid precoat by the filter septum is also important to provide for initial clarification and to protect the surface of the filter septum from fouling. Small amounts of fibrous materials, e.g. asbestos or cellulose, are sometimes added to the filter aid to facilitate initial formation of the precoat.

Filter aid particles, such as diatomite and perlite, normally disperse well in aqueous slurries, but when the liquid medium in the slurry is a relatively non-polar organic liquid, i.e. a liquid having a dielectric constant of less than about 30, and frequently below 10, at room temperature the filter aid particles tend to coagulate or agglomerate and flocculate.

For example, when 5 grams of diatomite is added to a 100ml graduate containing 100ml of water and the graduate shaken to disperse the diatomite the diatomite disperses rapidly and completely. After standing for about 60 minutes the diatomite settles to the bottom of the graduate to a compact volume of usually about 13–15ml. However, if the same test is run using cyclohexane in place of water the diatomite does not disperse completely and only settles to a volume of about 57ml. When toluene is used in place of water the diatomite does not disperse completely and only settles to a volume of about 35–37ml.

When agglomeration occurs the uniquely shaped discrete particles no longer function individually, but rather as coarse aggregations having inferior filtration characteristics. These coarse aggregations have the added disadvantage of forming a spongy, compressible filter cake which tends to collapse as filtration proceeds reducing the efficiency of the filtering process.

The agglomeration of the filter aid particles also results in an uneven precoat and a reduction in the protection of the surface of the filter septum. This lack of protection greatly increases filter down time for cleaning and maintenance. The agglomerates also tend to settle or precipitate out of the slurry in the pipes, the filter shell, and the precoat tank of the filtering system which is undesirable.

It has been proposed to add various dispersants or surfactants to the non-polar organic liquidfilter aid system or slurry before attempting to form a precoat and filter cake on a filtering surface in order to avoid the agglomeration problem. For example, U.S. Pat. Nos. 3,570,669 and 3,648,847 disclose adding a member of a family of oxazolines to a non-polar organic liquid slurry containing filter aid particles.

U.S. Pat. No. 3,368,678 discloses coating a filter aid, such as diatomite, with an aqueous solution of a cationic polymer having a polymer concentration of 1–15 weight percent, followed by drying the filter aid, to make the filter aid perform better in dry-cleaning solvents such as perchloroethylene.

Although the surfactants disclosed by the prior art as being useful in dispersing filter aid particles in hydrocarbon liquids are effective in some organic liquids they are ineffective in producing the desired dispersion in many relatively non-polar organic liquids. Further, the amount of some of these surfactants required and their high price make the cost of the solution to the problem undesirably high.

BRIEF SUMMARY OF THE INVENTION

It has now been discovered that filter aid particles, such as perlite and diatomite, having only a small amount of an aliphatic or aromatic hydroxypoly (oxyethylene) mixture of dihydrogen phosphate and monohydrogen phosphate esters, containing less than about 5.5 moles of ethylene oxide, absorbed on the surfaces thereof are highly dispersible in a large number of widely differing non-polar organic liquids. These results are unexpected in view of the fact that other commonly used surfactants, even when used in larger amounts, are not nearly as effective in as wide a range of relatively non-polar organic liquids as are the surfactants used in the present invention. Also, surfactants of the same type as used in the present invention, but containing more than about 5.5 moles of ethylene oxide, are not nearly as effective as those containing less than about 5.5 moles of ethylene oxide.

DETAILED DESCRIPTION AND PREFERRED EMBODIMENTS

The two most commonly used filter aid materials are diatomite and perlite and it is with these materials that the present invention is most useful. However, the filter aids may also comprise conventional fibrous filter aid materials, such as cellulose, asbestos, etc. In the work reported in this specification CELITE 503 and HYFLO SUPER-CEL, filter aid grade diatomites available from the Johns-Manville Corporation were used. Although these two filter aid grades of diatomite have slightly different filtration characteristics, they are equivalent insofar as their dispersion and settling characteristics in water and certain organic liquids are concerned. Both tend to flocculate or agglomerate when added to relatively non-polar organic liquids.

The complex organic phosphate esters of non-ionic surfactants of the ethylene oxide-adduct type useful in the products of this invention contain mixtures of primary and secondary phosphate esters of hydroxylic organic compounds. These phosphate esters can be made by the processes disclosed in U.S. Pat. Nos. 3,004,056 and 3,004,057 and are available in either unneutralized form or in the form of partially or completely neutralized salts containing cations of alkali metal alkaline earth metals, metals, ammonium and organic amines, e.g., from the GAF Corporation under the name GAFAC surfactants. The specific surfactants preferred for use in the products of this invention are GAFAC RS-410, GAFAC RE-410, GAFAC RO-310, GAFAC RM-4 10 and GAFAC RD-510 with GAFAC RS-410 being most preferred. GAFAC RS-410 is an α-Tridecyl -ω-hydroxypoly (oxyethylene) mixture of dihydrogen phosphate and monohydrogen phosphate esters that has an acid number (to pH 5-5.5) of 95-115 and is produced by the esterification of the condensation product of one mole of "oxo" process tridecyl alcohol with about 2.5 to 3.5 moles of ethylene oxide. This surfactant is a hazy viscous liquid having a moisture content of less than 0.5%, a specific gravity at 25°C of about 1.03-1.04, an ASTM pour point of about −15°C and an acid number (mg KOH/g product) to first inflection point (pH 5-5.5) of 95-115 and to a second inflection point (pH 9-9.5) of 160-180.

GAFAC RE-410 is an α- (p-Nonylphenyl) - ω- hydroxypoly (oxyethylene) mixture of dihydrogen phosphate and monophydrogen phosphate esters that has an acid number (to ph 5-5.5) of 85-100 and that is produced by the esterification of α- (p-nonylphenyl) - ω-hydroxypoly (oxyethylene) had has an average poly (oxyethylene) content approaching about 5.5 moles per mole of the nonylphenyl hydrophobic base. It is a clear to slightly hazy viscous liquid having a maximum moisture content of 0.5 percent, a specific gravity at 25°C of 1.0-1.2, an ASTM pour point of 18°C, an acid number to a first inflection point (pH 5-5.5) of about 85-100 and to a second inflection point (ph 9-9.5) of about 140-160.

GAFAC RD-510 is an α- dodecyl - ω- hydroxypoly (oxyethylene) mixture of dihydrogen phosphate and monohydrogen phosphate esters that has an acid number (to pH 5.2) of 103-111 and is produced by the esterification of the condensation product of one mole of n-dodecyl alcohol with 4-4.5 moles of ethylene oxide.

GAFAC RM-410 is a slightly hazy, viscous aromatic (oxyethylene) mixture of dihydrogen and monohydrogen phosphate esters having a specific gravity of 1.05-1.07 (25°C), an ASTM pour point of 19°C and an acid number (to pH 5-5.5) of 51-64 and (to pH 9-9.5) of 95-110.

While it is possible to combine these viscous liquid surfactants with the filter aid particles in various ways including diluting the surfacant with a solvent and spraying the diluted solution on the filter aid particles followed by drying, it is preferred to form an intimate mixture by the process disclosed in application Ser. No. 450,127 filed on Mar. 11, 1974, entitled Method For Making Filter Aids Dispersible In Hydrocarbon Liquids And The Dispersable Products, which disclosure is hereby incorporated by reference. The mixing process disclosed in application Ser. No. 450,127 involves intensively mixing all of the surfactant required in only a small portion of the total amount of filter aid required in a high shear mixer to form a first concentrated mixture. The first concentrated mixture is then gently blended with the remainder of the filter aid in one or more steps to form an intimate mixture of the filter aid particles and the surfactant. This mixing appears to be the more economical manner of preparing the products of the present invention.

The following examples illustrate the effectiveness of the present invention, but are not to be regarded as limiting the socpe of the invention.

EXAMPLE I

Four intimate mixtures, each containing diatomite, and further containing 0.20 weight percent of GAFAC RS-410, GAFAC RE-410, and GAFAC RD-510, and 0.25 weight percent GAFAC RS-610 respectively were prepared by first preparing a 50 percent first concentrated mixture using a Waring blender. GAFAC RS-610 is identical with RS-410 except it is produced by the esterification of the condensation product of one mole of "oxo" process tridecyl alcohol with about 5.5 to 6.5 moles of ethylene oxide. Sufficient diatomite was then gently blended with each of the four first concentrated mixtures to reduce the surfactant concentration to 0.20 weight percent. Five grams of each of the intimate mixtures were placed in 100ml graduates containing 100ml of various relatively non-polar organic liquids, dispersed or shaken by sealing the top of the graduate and inverting the graduate 180° three times, and the placed upright on a vibration free surface. After standing 60 minutes the volume of the settled diatomite was measured and the results are reported in Table I.

TABLE I

| | Surfactant & Percent Weight Concentration | | | |
|---|---|---|---|---|
| | GAFAC RS-410 0.20 | GAFAC RE-410 0.20 | GAFAC RD-510 0.20 | GAFAC RS-610 0.25 |
| Hydrocarbon Liquid | Settled | Volume(ml) | | |
| Toluene | 13.5 | 13.5 | 12 | 12 |
| Naptha | 13 | 18.5 | 13 | 15.5 |
| Perchlorethylene | 10 | 9 | 11 | 11 |
| Stoddard Solvent | 12 | 16.5 | 14 | 17 |
| Pentane | 11.5 | 11.5 | 11 | 12 |
| Hexane | 12 | 12 | 15 | 20 |
| Methyl ethyl ketone | 12 | 11 | 11 | 12 |
| Turpentine | 13-15 | N.R. | N.R. | N.R. |
| Raw Linseed Oil | 13-15 | N.R. | N.R. | N.R. |
| Cotton Seed Oil | 13-15 | N.R. | N.R. | N.R. |

N.R. – Not Run.

The data in Table I show that the two intimate mixtures containing RS-410 and RD-510 disperse rapidly and thoroughly in a wide range of relatively non-polar organic liquids. The intimate mixture containing RE-410 dispersed well in most of the liquids except that its performance in naptha was nominal. The filter aid containing RS-610, having a higher poly (oxyethylene) content was significantly inferior in dispersion characteristics compared with the filter aids containing RS-410 and RD-510. As a reference to use in evaluating these results, untreated diatomite when tested in the same manner with toluene only settles to a volume of 35-37ml.

In addition to being readily dispersible in relatively non-polar organic liquids, the products of the present invention are hydrophobic as compared with untreated filter aids which are hydrophilic. In addition, the treated filter aids of the present invention can tolerate much more water in the system than treated filter aids of the prior art, such as those disclosed in U.S. Pat. Nos. 3,570,669 and 3,648,847.

The results shown in Table I were unpredicted and unexpected in view of the results obtained from using other well known surfactants and treatments including those disclosed in U.S. Pat. Nos. 3,570,669 and 3,648,847.

EXAMPLE II

Intimate mixtures of diatomite and each of the surfactants used in Example I as well as the well known surfactants ARQUAD 2HT 75, available from Armour and Company, and CENTROLEX I and ACTIFLO 68UB, available from Central Soya Company, Inc., were made using the mixing procedure described in Example I. Each of these intimate mixtures was then tested, in the same manner disclosed in Example I, in toluene at various surfactant concentrations varying from 0.1 weight percent to 0.5 weight percent. The results are reported in Table II.

TABLE II

Settled Volumes (ml) in Toluene

| Surfactant Concentration | 0.1 wt.% | 0.2 wt.% | 0.3 wt.% | 0.4 wt.% | 0.5 wt.% |
|---|---|---|---|---|---|
| GAFAC RS-410 | 22.5 | 13.5 | 11 | 10 | 10 |
| GAFAC RE-410 | 33.5 | 13.5 | 13.5 | 13 | 12.5 |
| GAFAC RD-510 | 23 | 12 | 11 | 10 | 10.5 |
| GAFAC RS-610 | 27 | 15 | 13 | 13 | 12 |
| ARQUAD 2HT75 | 39 | 36.5 | 28 | 11-18* | 15 |
| CENTROLEX I | 35 | 29.5 | 13.5-20* | 17 | 14.5 |
| ACTIFLO 68UB | 33.5 | 28.5 | 22.5 | 17 | 14.5 |

*Different runs displayed unusual variation in settled volumes.

The results from Example II show that the surfactant concentration in the dispersible filter aid materials of the present invention should be greater than 0.1 weight percent and preferably less than 0.3 weight percent. Although surfactant concentrations of 0.3 weight percent or greater are suitable in the product of the present invention, the added cost of the higher concentrations are usually not justified by the slight improvement they produce. However, if mixing conditions are such that a completely uniform product is not being obtained, a surfactant addition of greater than 0.3 wt. percent can be used to insure a minimum concentration of 0.2-0.3 percent in any sampled portion.

The results of Example II also unexpectedly show that filter aid products containing surfactants that are mixtures of primary and secondary phosphate exters of hydroxylic organic compounds are superior to filter aid products containing other conventional surfactants, and at a much lower surfactant concentration. This lower surfactant concentration in the products of the present invention usually results in a cost saving for the surfactant component.

Although only three surfactants of complex organic phosphate esters of nonionic surfactants of the ethylene oxide-adduct type containing less than about 5.5 moles of ethylene oxide are exemplified many other anionic surfactants which are mixtures of monohydrogen and dihydrogen phosphate esters meeting the general description of the surfactants described earlier in the specification and containing from about 1 to about 5.5 moles, preferably up to about 5 moles and most preferably up to about 3.5 moles, of ethylene oxide would be suitable to use in making the products of the present invention. The base hydrophobe used in making the surfactant can be either aromatic or aliphatic.

The following examples further illustrate the unexpected properties of the products of the present invention.

EXAMPLE III

Three filter aid products containing, respectively, 0.4 weight percent ARQUAD 2HT75, 0.3 wt. percent CENTROLEX I, 0.44 wt. percent ACTIFLO 68UB were prepared using the procedure described in Example I. Five grams of each of these filter aid products were then dispersed in 100ml of various relatively non-polar organic liquids in a 100ml graduate using the procedure described in Example I and were then allowed to settle for 60 minutes. The settled volumes are reported in Table III and show that the filter aid products produced with these conventional surfactants, even at a higher surfactant concentration, did not perform as well as the filter aid products of the present invention.

TABLE III

Surfactant & Percentage Weight Concentration

| Hydrocarbon Liquid | ARQUAD 2HT75 0.4 | CENTROLEX I 0.3 | ACTIFLO 68UB 0.44 |
|---|---|---|---|
| | Settled Volume | | |
| Naptha | 30.5 | 20.5 | 17.5 |
| Methyl ethyl Ketone | 13 | 11 | 10.5 |
| Perchloroethylene | 11.5 | 18.5 | 15 |
| Stoddard solvent | 29 | 16 | 13 |
| Pentane | 25 | 12 | 12 |
| Hexane | 31 | 13.5 | 13 |

EXAMPLE IV

To compare the filter aid products of the present invention with the system disclosed in U.S. Pat. Nos. 3,570,669 and 3,648,847 the following tests were run. Various mixtures of DELTAZOLINES, A-10, A-12, A-16, A-18, and A-22, obtained from Reichhold Chemicals, Inc., and perchlorethylene were prepared as disclosed in the above cited patents. Five grams of diatomite were dispersed in 100ml of each of these mixtures in a 100ml graduate and shaken as described in Example I. The settled volumes after setting for sixty minutes are reported in Table IV.

TABLE IV

Settled Volumes (ml)

| Surfactant Concentration | 0.2 wt.% | 0.4 wt.% | 0.6 wt.% | 0.8 wt.% | 1.0 wt.% |
|---|---|---|---|---|---|
| DELTAZOLINES | | | | | |
| A-10 | 34 | 25 | 22.5 | N.D. | 20 |
| A-12 | 33 | 25 | 21 | 18 | 18 |
| A-16 | 29 | 17 | N.D. | N.D. | N.D. |
| A-18 | 34 | 23 | 18 | N.D. | N.D. |
| A-22 | 45 | 35 | 27 | 22 | 20 |

N.D. – Not Determined.

Comparing these results with the perchlorethylene results reported in Table I for the products of the present invention shows the superior dispersion characteristics of the products of the present invention.

What I claim is:

1. A filter aid product dispersible in relatively non-polar organic liquids comprising an intimate mixture of a filter aid material and more than 0.1%, based on the weight of the filter aid material, of a surfactant selected from a group consisting of aliphatic and aromatic hydroxypoly (oxyethylene) mixtures of dihydrogen phosphate and monohydrogen phosphate esters containing from about 1 to about 5.5 moles of ethylene oxide per mole of aliphatic or aromatic base.

2. A filter aid product according to claim 1 wherein said filter aid material is selected from the group of diatomite and perlite.

3. A filter aid product according to claim 2 wherein the surfactant contains from about 1 to about 5 moles of ethylene oxide per mole of aliphatic or aromatic base.

4. A filter aid product according to claim 3 wherein said product contains less than 0.3 percent, based on the weight of said filter aid material, of said surfactant.

5. A filter aid product according to claim 4 wherein said surfactant is an $\alpha$- tridecyl -$\omega$- hydroxpoly (oxyethylene) mixture of dihydrogen and monohydrogen phosphate esters having an acid number (pH 5–5.5) of between about 95 and about 115 and containing up to about 3.5 moles of ethylene oxide per mole of tridecyl alcohol.

6. A filter aid product according to claim 1 wherein said product contains less than about 0.3 percent, based on the weight of said filter aid material, of said surfactant and wherein said surfactant is an $\alpha$- dodecyl - $\omega$ - hydroxypoly (oxyethylene) mixture of said phosphate esters having an acid number (to a pH of 5.2) in the range of about 103 to about 111 and containing up to about 4.5 moles of ethylene oxide per mole of dodecyl alcohol.

7. A filter aid product according to claim 3 wherein said filter aid material is diatomite.

8. A filter aid product according to claim 4 wherein said filter aid material is diatomite.

9. A filter aid product according to claim 5 wherein said filter aid material is diatomite.

10. A filter aid product accordint to claim 6 wherein said filter aid material is diatomite.

* * * * *

UNITED STATES PATENT AND TRADEMARK OFFICE
CERTIFICATE OF CORRECTION

PATENT NO. : 3,872,016
DATED : March 18, 1975
INVENTOR(S) : George Richard Bell

It is certified that error appears in the above-identified patent and that said Letters Patent are hereby corrected as shown below:

Column 1, line 6 - "surface" should read --surfaces--

Column 3, line 26 - "ph" should read --pH--

Column 4, line 15 - "the" should read --then--

Column 4, Table I, line 30 - "11" should read --9--

Column 5, line 41 - "exters" should read --esters--

Signed and Sealed this

Twentieth Day of July 1976

[SEAL]

Attest:

RUTH C. MASON
*Attesting Officer*

C. MARSHALL DANN
*Commissioner of Patents and Trademarks*